US009564055B2

(12) United States Patent
Shipley et al.

(10) Patent No.: US 9,564,055 B2
(45) Date of Patent: Feb. 7, 2017

(54) PREDICTION AND WARNING OF TRANSPORTED TURBULENCE IN LONG-HAUL AIRCRAFT OPERATIONS (71) Applicant: WxOps, Inc., Honolulu, HI (US)

(72) Inventors: Scott T. Shipley, Satellite Beach, FL (US); Mark D. Spence, Montreat, NC (US); Gary P. Ellrod, Granby, CT (US)

(73) Assignee: WXOPS, INC., Honolulu, HI (US)

( * ) Notice: Subject to any disclaimer, the term of this patent is extended or adjusted under 35 U.S.C. 154(b) by 0 days.

(21) Appl. No.: 15/183,304

(22) Filed: Jun. 15, 2016

(65) Prior Publication Data
US 2016/0293021 A1 Oct. 6, 2016

Related U.S. Application Data (60) Provisional application No. 62/175,659, filed on Jun. 15, 2015, provisional application No. 62/180,447, filed on Jun. 16, 2015.

(51) Int. Cl.
G08G 5/00 (2006.01)
H04L 29/08 (2006.01)

(52) U.S. Cl.
CPC ............ G08G 5/0091 (2013.01); G08G 5/003 (2013.01); H04L 67/12 (2013.01)

(58) Field of Classification Search
CPC ........ G08G 5/0091; G08G 5/003; H04L 67/12
See application file for complete search history.

(56) References Cited

U.S. PATENT DOCUMENTS 5,945,926 A * 8/1999 Ammar ................ F41G 7/2226
340/961
6,563,452 B1 * 5/2003 Zheng ..................... G01S 7/003
342/195

(Continued)

OTHER PUBLICATIONS

Croft, John; "New Flight Deck Apps Help Pilots Avoid Turbulence", Aviation Week & Space Technology, Sep. 15, 2015.

(Continued)

Primary Examiner — Calvin Cheung
(74) Attorney, Agent, or Firm — Nath, Goldberg & Meyer; Jerald L. Meyer; Stanley N. Protigal (57) ABSTRACT An aviation flight planning system is used for predicting and warning for intersection of flight paths with transported meteorological disturbances, such as transported turbulence and related phenomena. Sensed data and transmitted data provide real time and forecast data related to meteorological conditions. Data modelling transported meteorological disturbances are applied to the received transmitted data and the sensed data to use the data modelling transported meteorological disturbances to correlate the sensed data and received transmitted data. The correlation is used to identify transported meteorological disturbances source characteristics, and identify predicted transported meteorological disturbances trajectories from source to intersection with flight path in space and time. The correlated data are provided to a visualization system that projects coordinates of a point of interest (POI) in a selected point of view (POV) to displays the flight track and the predicted transported meteorological disturbances warnings for the flight crew.

19 Claims, 5 Drawing Sheets
(5 of 5 Drawing Sheet(s) Filed in Color)

(56) References Cited

U.S. PATENT DOCUMENTS

| | | | | |
|---|---|---|---|---|
| 7,109,913 | B1* | 9/2006 | Paramore | G01C 23/00 |
| | | | | 342/176 |
| 7,515,088 | B1* | 4/2009 | Woodell | G01S 7/003 |
| | | | | 342/175 |
| 7,580,776 | B1* | 8/2009 | McCusker | G08G 5/045 |
| | | | | 701/10 |
| 8,604,963 | B1* | 12/2013 | Kronfeld | G01S 7/003 |
| | | | | 342/26 B |
| 8,994,578 | B1* | 3/2015 | Finley | G01S 13/953 |
| | | | | 342/179 |
| 9,395,438 | B1* | 7/2016 | Woodell | G01S 7/04 |
| 2004/0068372 | A1* | 4/2004 | Ybarra | G05D 1/0607 |
| | | | | 701/301 |
| 2010/0094487 | A1* | 4/2010 | Brinkman | G01C 25/00 |
| | | | | 701/14 |
| 2010/0131126 | A1* | 5/2010 | He | G01C 21/00 |
| | | | | 701/14 |
| 2010/0245164 | A1* | 9/2010 | Kauffman | G01S 7/22 |
| | | | | 342/26 B |
| 2010/0271239 | A1* | 10/2010 | Kolcarek | G01W 1/00 |
| | | | | 340/971 |
| 2014/0058675 | A1* | 2/2014 | He | G01C 21/00 |
| | | | | 701/533 |
| 2015/0339930 | A1* | 11/2015 | McCann | G08G 5/0039 |
| | | | | 701/528 |
| 2016/0225263 | A1* | 8/2016 | Salentiny | G08G 5/003 |

OTHER PUBLICATIONS

Byers, Horace R., et al. "Thunderstorm Structure and Circulation", Journal of Meteorology, vol. 5, No. 3, Jun. 1948.

Ching, J.K.S., et al. "Evidence for Cloud Venting of Mixed Layer Ozone and Aerosols", Atmospheric Environment, vol. 22, No. 2, pp. 225-242, 1988.

Cornman, Larry B., et al. "An Update on the FAA Aviation Weather Research Program's In Situ Turbulence Measurement and Reporting System", 11th Conf. on Aviation, Range and Aerospace Meteorology, Hyannis, MA, Amer. Meteor. Soc. 2004.

Draxler, Roland R. "Hysplit_4 User's Guide", NOAA Technical Memorandum ERL ARL-230, NOAA Air Resources Laboratory, Silver Spring, Maryland, Jun. 1999.

Ellrod, Gary P., et al. "Improvements to an Operational Clear-Air Turbulence Diagnostic Index by Addition of a Divergence Trend Term", Weather and Forecasting, vol. 25, No. 2, pp. 789-798, Apr. 2010/.

Ferguson, Howard L., "Mathematical and Synoptic Aspects of a Small-Scale Wave Disturbance Over the Lower Great Lakes Area", J. Appl. Meteor., vol. 6, pp. 523-529, Jun. 1967.

Kaplan, Michael L., "Characterizing the Severe Turbulence Environments Associated With Commercial Aviation Accidents", Part I:44 Case Study Synoptic Observational Analyses; NASA/CR-2002-211918, Aug. 2002.

Lane, Todd P., et al. "Recent Advances in the Understanding of Near-Cloud Turbulence", American Meteorological Society, pp. 499-515, Apr. 2012.

Lin, Yuh-Lang, et al. "A study of a mesoscale Solitary Wave in the Atmosphere Originating near a Region of Deep convection", Journal of the Atmospheric Sciences, vol. 45, No. 2, pp. 194-205, 1988.

Wagner, A. James, "Gravity Wave Over New England, Apr. 12, 1961", Monthly Weather Review vol. 90, pp. 431-436, Oct. 1962.

Knox, John A., et al. "Verification of Clear Air Turbulence (CAT) Forecast Indices During Two Winters", The University of Gerogia, COMET, P3.22, work funded by UCAR/COMET, 2009-2010.

"Transported Turbulence during Climb, Cruise and Descent", WxOps, SBIR Report 2015-1 A3.03-8717, Dec. 17, 2015.

"Transported Turbulence during Climb, Cruise and Descent, Phase I Project", SBIR/STTR Programs, Space Technology Mission Directorate (STMD), TechPort, NASA, printed Jun. 10, 2016.

Ellrod, G. P., J. A. Knox, P. F. Lester, and L. J. Ehernberger "Clear Air Turbulence", In: Gerald R. North (editor-in-chief), John Pyle and Fuqing Zhang (editors). Encyclopedia of Atmospheric Science, 2nd Edition, Academic Press, Elsevier, Inc., vol. 1, pp. 177-186, 2015.

Seiler, Wolfgang, et al. "The Distribution of Carbon Monoxide and Ozone in the Free Troposphere", Journal of Geophysical Research, vol. 86, No. C8, pp. 7255-7265, Aug. 20, 1981.

* cited by examiner

PREDICTION AND WARNING OF TRANSPORTED TURBULENCE IN LONG-HAUL AIRCRAFT OPERATIONS

RELATED APPLICATION(S)

The present patent application claims priority to Provisional Patent Application No. 62/175,659 filed Jun. 15, 2015, and No. 62/180,447 filed Jun. 16, 2015, which are incorporated by reference herein.

STATEMENT REGARDING FEDERALLY SPONSORED RESEARCH OR DEVELOPMENT

This invention was made with Government support under contract NNX15CA60P awarded by NASA. The Government has certain rights in the invention.

BACKGROUND

Field

The present disclosure relates to generation and display of weather and related information for flight planning. In particular, the present disclosure relates to prediction of the intersection of flight paths with transported meteorological disturbances.

Background

The technique described herein addresses Clear Air Turbulence (CAT) events which are not identified by current CAT prediction formalisms and/or commercial CAT prediction products, and which events are a cause of significant damage and injury encountered during long-haul commercial flights over remote oceanic areas. Such events are not uncommon, and occur in areas that are free of clouds, and are not located near jet stream or upper frontal shear zones associated with the Ellrod-Knox formalism, and are at large distances from possible "near-cloud" turbulence associated with convective storms. Similar considerations apply to the intersection of flight paths with other forms of transported meteorological disturbances and related phenomena, which may comprise volcanic gases and aerosols, radionuclide plumes, and tracers deliberately inserted to simulate a hazard source.

"Clear Air", as used herein, means not in-cloud (satellite methods) and/or without precipitation (radar methods). "Clear air" is a negative recursive term, in that it references conditions other than conditions that are considered to be "Clear Air" encounters.

SUMMARY

An aviation flight planning system is used for predicting and warning for intersection of flight paths with transported meteorological disturbances, which may comprise transported turbulence and related phenomena. A coordinating computer located on board an aircraft receives sensed data from sensing equipment on board the aircraft providing real time sensed information related to meteorological conditions, and transmitted data received on board the aircraft, providing real time and forecast data related to meteorological conditions. The sensed and received data are stored in a flight plan information store. A transported meteorological disturbances model provides data modelling transported meteorological disturbances and the model is applied to the received transmitted data and the sensed data to use the data modelling transported meteorological disturbances to correlate the sensed data and received transmitted data. The correlation is used to identify transported meteorological disturbances source characteristics, identify predicted transported meteorological disturbances trajectories from source to intersection with flight path in space and time and communicate relevant aspects of the predicted transported meteorological disturbance trajectories. The correlated data are provided to a visualization system for observations from flight deck for verification and analysis.

The visualization system is used to acquire at least one flight track as a focus object, acquire at least one transported turbulence prediction as a focus object, use focus object information to display the focus object, subdivide each focus object into a plurality of object components, and use a transparent interface to calculate coordinates of components of the focus object in a coordinate system of the visualization system. The focus object is mutually shared by the visualization system and the transparent interface to provide a visual indication of the transported meteorological disturbances. The visualization system receives coordinates of a point of interest (POI) in a projection of the visualization system, and projects the POI in a selected point of view (POV) using the calculated coordinates and the received coordinates of the POI in the projection of the visualization system of N dimensional features in the visualization, independent of user point of view, and displays the flight track and the relevant aspects of the predicted transported meteorological disturbances as warnings for the flight crew.

BRIEF DESCRIPTION OF THE DRAWINGS

The file of this patent contains at least one drawing executed in color. Copies of this patent with color drawing(s) will be provided by the Office upon request and payment of the necessary fee.

DETAILED DESCRIPTION

Overview

A Transported Turbulence Product (TTP) is described which follows the forensic analysis procedures currently used to evaluate potential causes for such encounters during Clear Air Turbulence (CAT) incident investigations. By performing the forensic analysis ahead of time, dispatchers can use flight plan intersections with predicted transported turbulence prediction regions to warn pilots prior to entry into high probability areas for such Transported Turbulence. Timely warnings will allow for either avoidance of, or for material and personnel in the cabin to be secured during, transit of the high probability areas for transported turbulence. These warnings can be integrated with cockpit displays and with inflight Electronic Flight Bag (EFB) equipment for cockpit use as now allowed by US Federal Aviation Administration (FAA) regulations.

The technique described is useful to general and commercial aviation, and to scientific personnel for Flight Operations during field experiments, especially for topics involving the tracking and detection of atmospheric trace constituents. The transported turbulence prediction technique employs advection of hazard-related tracers with warning times on the order of hours, and therefore extends the value of dated satellite and other remote observational data (hours since collection) without the requirement for real time data delivery. The transported turbulence predictions are delivered in Open Geospatial Consortium (OGC) formats which allow immediate import into most geobrowser based Common Operating Environment (COE) and Geographic Information System (GIS) visualization systems. Virtual Globe systems and applications extend the utility of transported turbulence prediction to other atmospheric hazards including volcanic aerosols and radionuclides, and are therefore ideal for the assembly and analysis of field experiment data on both terrestrial and extra-terrestrial globes.

While pilots and piloted aircraft are described, it is understood that the techniques can be used for flight decks and aircraft control facilities for other aircraft, such as, by way of non-limiting examples, manned, remote piloted vehicles, and automated unmanned systems.

The techniques described herein provide user tracking of long-range air transport and plume evolution and are useful to Dispatch and EFB Class 1 (unattached, e.g., handheld), Class 2 (mounted) and Class 3 (installed flight equipment subject to airworthiness requirements) applications, both on the ground and in flight. The Common Operating Environment (COE) approach reduces error of interpretation and user workload both on the ground and in the cockpit, which is especially important for icing hazard avoidance during Extended Operations (STOPS) (FAA requirement for alternate landing sites in event of depressurization or engine failure). Based upon benefits demonstrated at Hawaiian Airlines, any reductions in injury and/or improvements in airline performance will help reduce operations and insurance costs, and will see expanded use in the international commercial air transport industry.

Prediction is made of unanticipated Clear Air Turbulence (CAT) which is related to turbulence precursors injected upstream and transported over long ranges to the location of the CAT events and other transported meteorological disturbances other than visible precipitation. The transported CAT events are not identified by current CAT prediction formalisms and cause significant damage and injury when encountered during long-haul flights over oceanic areas. Such events are not uncommon and occur in areas that are free of clouds, are not located near the jet stream or upper frontal shear zones associated with the Ellrod-Knox formalism describing the Ellrod-Knapp turbulence index (TI) for CAT. It has been found that there are at large distances between some CAT events from possible "near-cloud" turbulence associated with convective storms.

In addition to CAT, the transported meteorological disturbances can comprise related phenomena having similar transport characteristics to transported turbulence. Non-limiting examples of such transported meteorological disturbances comprise volcanic gases and aerosols, radionuclide plumes, and tracers deliberately inserted to simulate a hazard source.

A Transported Turbulence Product (TTP) is produced for use by dispatch personnel in a commercial airline setting, and has been tested at Hawaiian Airlines during long-haul flights over the Pacific Ocean. The transported turbulence prediction and display product provides a combined interactive display of transported turbulence prediction renderings of volumetric positions with planned flight paths in a 4-dimensional visualization. This visualization allows rapid recognition of intersections or collocation in space and time as dispatchers or other users control time as a variable. It has been found that dispatchers can warn pilots prior to entry into high probability areas for transported turbulence, in which the warnings allow material and personnel in the cabin to be secured during transit. In addition to reducing damage and injury, transported turbulence prediction warnings can potentially lower carrier operating costs by reducing insurance premiums. The technique can also address warnings and avoidance of volcanic aerosol plumes and radionuclide layers.

Figure 1:
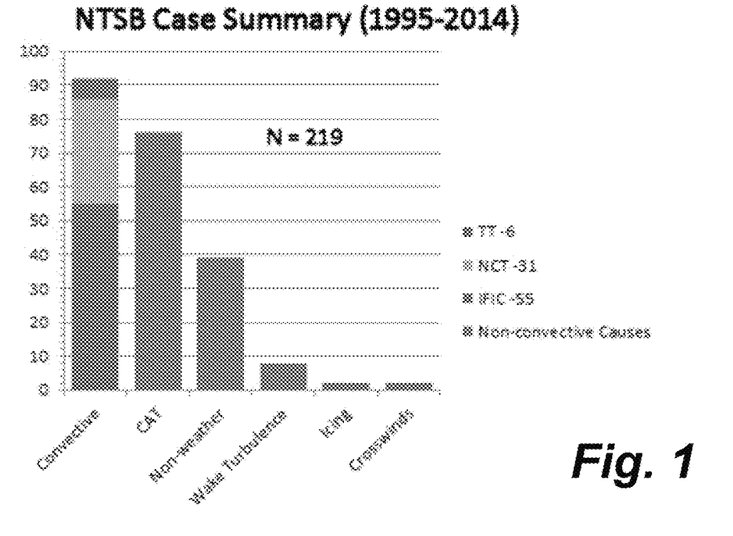
FIG. 1 is a graphic depiction of frequency of accidents and incidents for various causes in the NTSB database from 1995-2014.

An analysis of the NTSB data base from 1995 through 2014 reveals 219 accidents/incidents involving turbulence and large commercial jets (Part 121 class). FIG. 1 is a graphic depiction of frequency of accidents and incidents for various causes in the NTSB database from 1995-2014. The frequency of all of the 219 NTSB cases is summarized in FIG. 1. In the figure:

TT=transported turbulence,

NCT=near-cloud turbulence, and

IFIC=inadvertent flight into convection.

Most turbulence events resulted in serious injuries to one or more flight attendants or passengers. "Foreign" (non US jurisdiction) cases were not included in an analysis as there was insufficient information on them. Of the 219 accidents/incidents, 180 were weather-related. 92 of those were attributed in some way to convective activity, or about 51% of the total. The breakdown within the convective category was as follows:

| | |
|---|---|
| Inadvertent flight into convection (IFIC) | 55 (60%) |
| Near-cloud turbulence (NCT) | 31 (33%) |
| Transported turbulence (TT) | 6 (7%) |

It is sometimes difficult to distinguish IFIC from NCT, even with good radar and satellite data. Many of the NCT case narratives have some clues to make the conclusion of IFIC, such as a storm cell that grew rapidly just ahead of the aircraft along the flight path, and which was not detected by radar. For transported turbulence cases (shown in Table 1), the crews usually testified that they were in the clear, in cirrus, and/or did not see any echoes on radar or visually within at least 10 miles:

TABLE 1

Transported Turbulence Events from the NTSB Accident Database

| | Event Date | Time | Altitude (FL) | Location | Make/Model | Carrier | Lag (hr) |
|---|---|---|---|---|---|---|---|
| 1 | Dec. 3, 2010 | 1042 UTC | 180 | Pago Pago | Boeing 767 | Hawaiian | 1 |
| 2 | May 16, 2009 | 1545 UTC | 350 | Cuba (MWCR) | Boeing 757 | Delta | 3 |
| 3 | Apr. 25, 2007 | 2335 UTC | 130 | LaPlata, MD | Boeing 737 | Southwest | <1 |
| 4 | Apr. 29, 2005 | 1231 UTC | 410 | Little Rock, AR | Boeing 737 | Southwest | 2 |
| 5 | Jul. 25, 2004 | 0515 UTC | 370 | 18.5N 75.2W E of Jamaica | Boeing 777 | American | 5 |
| 6 | Jul. 8, 1999 | 1810 UTC | 290 | 180S Bermuda | Boeing 737 | Continental | 3 |

In four of the six transported turbulence cases, lag (or lead) time between storm development and projected turbulence arrival at the aircraft locations varied from 2 to 5 hours. Thus, warnings could have been issued to the aircraft to alert them to possible severe turbulence based on advection of the turbulence using upper air wind data from numerical prediction models, rawinsonde profiles, or satellite cloud motion vectors. The warnings (if relayed in a timely fashion via satellite uplink) would have been reliable, possibly preventing the injuries that occurred. In the other two cases, the lead time was probably too short (≤1 hr) to have allowed timely advisories to the flight crews.

Therefore, it is possible that roughly 5% of severe turbulence encounters could be related to transported turbulence. This is similar to the results of an analysis by Lane, et al. (Lane, T. P., R. Sharman, S. Trier, R. Fovell, and J. Williams, Recent advances in the understanding of near-cloud turbulence. Bull. Amer. Meteor. Soc., 499-515, 2012) using EDR data from commercial jet airliners that found the risk of convectively induced moderate to severe turbulence at 30 km or more to be 4% or less. This value is still well above the background risk (0.03%) for all sources of turbulence in the EDR database. Thus, it should not be unexpected that moderate to severe turbulence at longer distances, even greater than 100 km, from convective storms could occur.

Other weather-related causes for the incidents were: CAT 76 (42%), wake turbulence 8 (4%), icing 2 (1%) and cross winds 2 (1%). A few of the CAT cases were along the cirrus boundaries of mesoscale convective systems but quite far from the heavy radar echoes.

Example of a Transported Turbulence Warning Situation—Eastern Cuba

Figure 2:
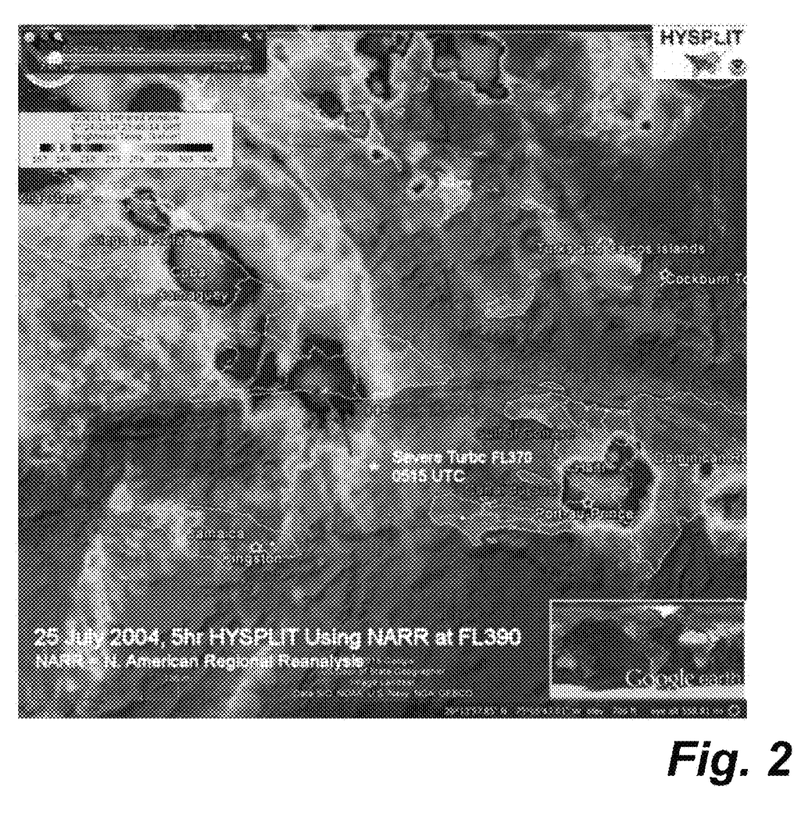
FIG. 2 is a depiction of a display showing a flight in which clear air turbulence was encountered downwind of eastern Cuba.

FIG. 2 is a depiction of a display showing a flight in which clear air turbulence was encountered downwind of eastern Cuba, showing a five hour Hybrid Single Particle Lagrangian Integrated Trajectory Model (HYSPLIT) trajectory (red) ending at 0500 UTC, 25 Jul. 2004 superimposed on a GOES-12 IR image valid 2345 UTC, displayed on a Google Earth geobrowser. The HYSPLIT trajectory was based on forecast upper level winds at 39,000 ft MSL, derived from the North American Regional Reanalysis (NARR).

In one non-limiting example, on Jul. 25, 2004, a Boeing-777 airliner enroute from Miami to Sao Paulo, Brazil encountered brief "clear air turbulence" between eastern Cuba and Jamaica at Flight Level 370 around 0515 UTC, resulting in serious injury to a flight attendant. The vertical acceleration obtained from the Flight Data Recorder was a maximum of +1.6 g, which classifies it as severe turbulence. In FIG. 2, GOES IR imagery at 2345 UTC displayed in a Google Earth Common Operating Environment (COE) shows that a strong thunderstorm system had developed five hours earlier over eastern Cuba. This thunderstorm reached a minimum Cloud Top IR Temperature of −65 C (shown by the light green) and dissipated a couple hours later. A forward, 5-hr trajectory at 39 kft MSL derived from the Hybrid Single Particle Lagrangian Integrated Trajectory (HYSPLIT) model (Draxler et al. 1999) is shown as a red line in FIG. 2. This information could have been used to warn of possible NCT south of the area of convection over the Caribbean Sea. The 5-hour endpoint of the trajectory was in the vicinity of the aircraft at the time of reported turbulence (shown by the white asterisk).

Example of a Transported Turbulence Warning Situation—Vanuatu CAT Event

Figure 3:
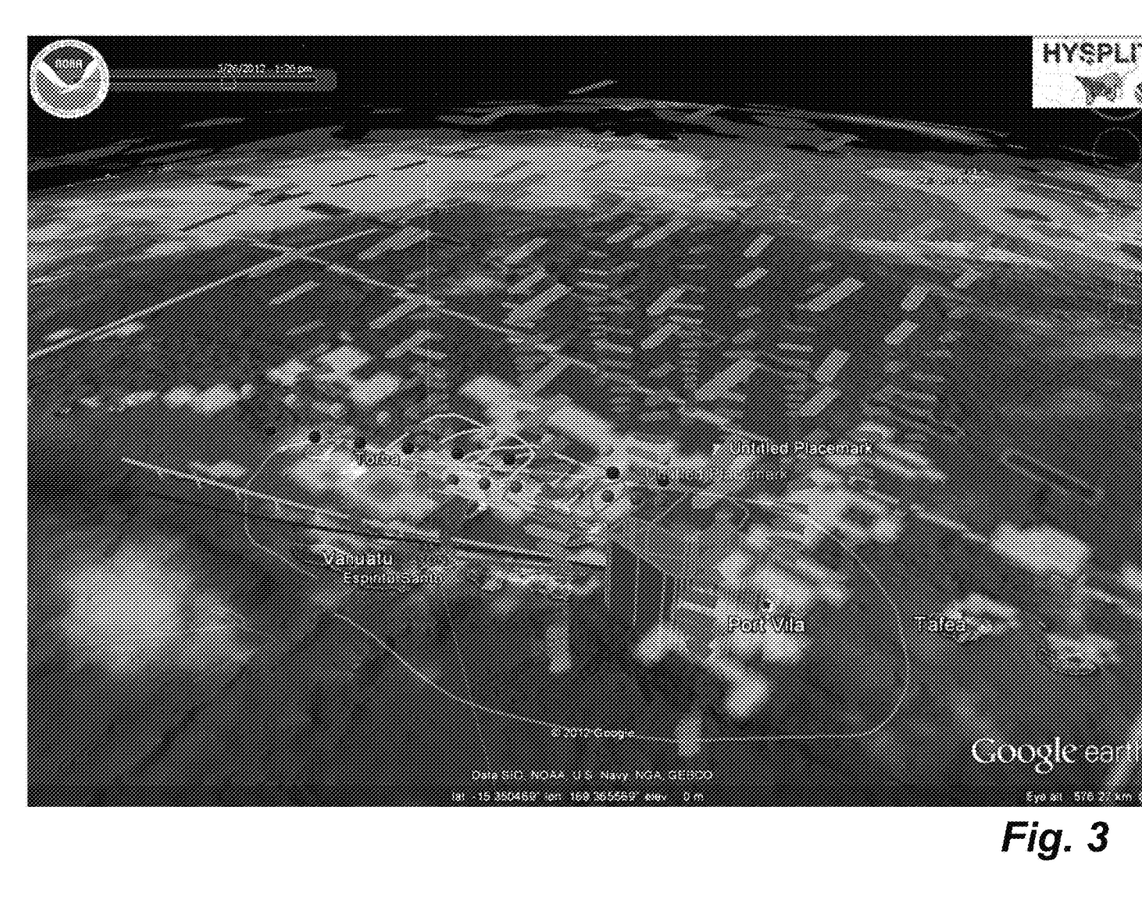
FIG. 3 is a depiction of a display rendering of transported turbulence probability according to the described technology.

FIG. 3 is a depiction of a display rendering of transported turbulence probability according to the described technology. The depicted display is given by way of non-limiting example, as it is expected that there will be various implementations of the disclosed technology.

Transported turbulence prediction is an estimation of a Transported Turbulence Product (TTP), which is based on transported turbulence predictions occurring at particular locations at particular times. This is similar to other weather predictions, in that past and present events are used to predict a particular condition at a particular time. In the case of CAT, the actual turbulence is not directly detected except by PIREPs and occasionally extracted from weather balloon data. Potential unpredicted turbulence is depicted by cyan contours (left-most 4 contours, starting near the SON identification label box), and advection downwind of a TSTM event is depicted in magenta contours (right-most 3 contours, close to the BA identification label box). In the depiction, an A330 aircraft, inbound to Honolulu, encountered severe turbulence just NE of Vanuatu (SON VOR). Standard predictions for CAT indicated a smooth flight (green flight track). HYSPLIT isentropic trajectories (dots) suggest how advection can transport CAT or its precursors downwind at high altitudes.

In the depiction of FIG. 3, the A330 aircraft inbound to Honolulu was in the vicinity of the SON VOR when it encountered CAT at altitude FL350. The red X depicted in the display of FIG. 3 marks the approximate surface location of the encounter. Dispatchers were unaware of any CAT expected along the flight path, as verified by the Jeppesen Turbulence product for FL350 as shown. Areas with green outlines denotes light TRB; areas with yellow outlines (e.g., near SON and to the right of BA 361) are moderate; and areas with red outlines are heavy. There is no severe TRB in the vicinity (magenta). Wind barb stacks were created from the GFS model using NOMADS, and these do not indicate any shear driven features associated with CAT (Ellrod and Knox, 2010).

The NOMADS Keyhole Markup Language (KML) wind barb stacks are consistent with the Jeppesen TRB product, which is also derived from the Global Forecast System (GFS) model. In such cases the FAA and NTSB usually look for TSTM (thunderstorm) "blow off" which can sometimes be seen in satellite animations. A relatively small TSTM candidate is found upwind of the incident site but with a cirrus feature visible in the IR for approximately 3 hours (magenta contours in FIG. 3, in the vicinity of VOR station "VU" 114.3). Hybrid Single Particle Lagrangian Integrated Trajectory (HYSPLIT, 1991) isentropic trajectories were run for one hour time steps at 8,000 m (red), 10,000 m (blue) and 12,000 m (green), with FL350 corresponding to 10,668 m MSL. The trajectories are based upon GFS model winds, and are used to construct the projected locations of the cirrus contour assuming it is advected as a passive tracer (cyan contours). The tracked area intersects the location of the incident approximately 6 hours after the convective event. This intersection of the aircraft flight path and the CAT could have been estimated at least 3 hours before the incident by dispatch personnel using the disclosed technology. Given such warnings, precautions can be taken that could prevent injury.

Flight Intersection with Transported Turbulence

Figure 4:
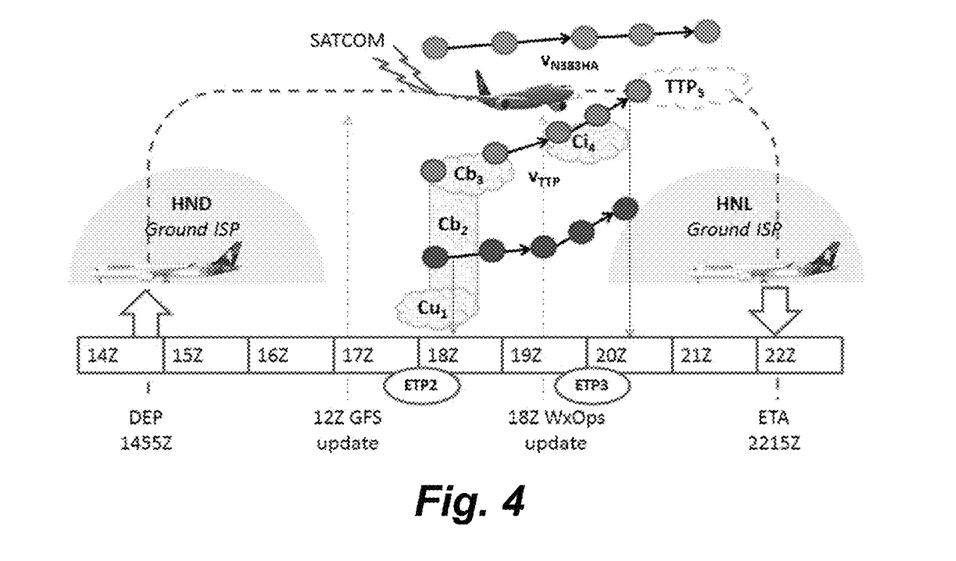
FIG. 4 is a schematic diagram depicting an idealized time history for transported turbulence intersection during a typical long-haul flight (Haneda to Honolulu).

FIG. 4 is a schematic diagram depicting an idealized time history for transported turbulence prediction intersection during a typical long-haul flight (Haneda to Honolulu). In this idealization, the transported turbulence generating convection (Cb2) injects tracers at or near flight level (Cb3), which cross the flight track (TTP5) after approximately 2 hours of transport at a velocity $v_{TTP}$. The transported turbulence prediction region stretches due to vertical shearing, and is likely associated with strong capping temperature inversions (Ching et al., 1988). Pre-flight transported turbulence prediction warnings are impacted by the difficulty in predicting convection. Waypoints ETP2 and ETP3 are shown for reference, since waypoints are generally used as a flight planning reference.

The depiction of FIG. 4 provides an idealized timeline for a flight involving an intersection with transported turbulence prediction, as a non-limiting example. An initial evaluation of the NTSB database seems to indicate that transported turbulence is more likely in the time range of hours after air parcel injection (or entrainment) by a generating convection cell, in which time the visible indication of injected air mass tracers (e.g., cirrus) has dissipated. Cloud injection has been observed in the lower troposphere by Ching et al. (1988) with tracers of individual cloud cells still intact after 12 hours of horizontal isentropic transport. Such transport challenges numerical model assumptions of eddy diffusion at the sub-grid scale. In addition, injected materials such as water vapor and aerosol promote the development of strong capping inversions, which suppress mechanical mixing and strengthen vertical wind shear. Such structures have been observed to persist over periods of days (Seiler and Fishman, 1981) and are regularly but randomly observed in rawinsonde profiles. The mechanism for transported turbulence generation is largely theoretical; however, the experience of Hawaiian Flight 452 over Vanuatu on 26 Mar. 2012 (about 1350 UTC as shown in FIG. 3) leads to the conclusion that the association exists and some physical process is at work.

Dynamic Cockpit Display

Transported turbulence probability is rendered on a cockpit display, providing a dynamic rendering of the transported turbulence probability based on transported turbulence prediction predictions. The display allows the pilot to visualize the transported turbulence probability and take action to avoid CAT from transported turbulence prediction in the manner of avoiding visible conditions and conditions rendered by radar or other directly sensed data. In addition, since the rendered display is itself a model, data can be extracted from the rendered display to either report the sensed transported turbulence probability or, where permitted, change course to evade or deliberately intercept a region of transported turbulence probability.

A coordinating computer located on board an aircraft receives sensed data from sensing equipment on board the aircraft providing real time sensed information related to meteorological conditions, and receives transmitted data, which is received on board the aircraft. The sensed data and received data provide real time and forecast data related to meteorological conditions. A flight plan information store communicatively connected to the coordinating computer is used to store flight plan information. The flight plan store may be internal to the coordinating computer or may be provided externally, for example from an electronic flight bag (EFB) or other flight computer equipment used for flight planning. The coordinating computer also has a transported meteorological disturbances model store that provides the coordinating computer with data modelling transported meteorological disturbances. The coordinating computer uses the sensed and received data and the data modelling transported meteorological disturbances to correlate the sensed data and received transmitted data to identify transported meteorological disturbances source characteristics, identify predicted transported meteorological disturbances trajectories from source to intersection with flight path in space and time. The coordinating computer then communicates relevant aspects of the predicted transported meteorological disturbances trajectories.

The relevant aspects are communicated to a flight display so that the pilot or flight control and flight planning or navigation equipment may use the information for flight planning purposes, which may include en-route re-planning. The pilot or dispatcher is then able to verify and analyze the data, and flight planning can be effected to accommodate the expected transported meteorological disturbances, either by avoiding the disturbance or by appropriate precautions, such as securing passengers and loose items and adjusting penetration speed.

The flight display provides visualization for viewing the transported turbulence predictions. The projected flight track and transported turbulence predicted locations are presented by the visualization system as focus objects and the focus objects are configured to present information about the focus objects with or without user interaction. Each focus object is subdivided into plural object components. A transparent interface is used to calculate coordinates of components of the focus object in a coordinate system of the visualization system. Each focus object mutually shared by the visualization system and the interface. Coordinates of a point of interest (POI) identified by a user are received in a projection of the visualization system. The POI is projected in a selected point of view (POV) using the calculated coordinates and the received coordinates of the POI in the projection of the visualization system of N dimensional features in the visualization, independent of user point of view. The relevant aspects of the predicted transported meteorological disturbances trajectories are displayed and used as warnings for the flight crew. This process can proceed without user interaction and an alert can be automatically generated when an intersection of the flight track with transported turbulence is detected in the near future.

In addition to providing information for the flight crew, the system can archive data used to generate alerts and warnings along with pilot and instrument observations of hazard strength at the intersection of flight paths with transported meteorological disturbances or waypoints. This allows collection of data to characterize hazard behavior and frequency of occurrence and storing the data in a data store.

The identification of intersects with regions of transported turbulence is improved through the use of data layer animation within the 4D geobrowser common operating environment (COE). The dispatcher or other user controls valid time to explore hazards which may appear along the flight path. Both the aircraft location and potential hazards are variable in space and time and follow their own trajectories. The displayed image changes in time and presents the dispatcher with the likely state of the atmospheric hazard(s) at near future times and locations, and clearly shows when the aircraft and potential predicted hazard(s) are in close proximity. Sample displays demonstrating the collocation of actual transported turbulence with HA451 on 8 Dec. 2015 are provided in FIGS. 6A, 6B and 6C, which comprise a time series of transported turbulence hazard collocation for the case study shown in FIG. 5.

Figure 5:
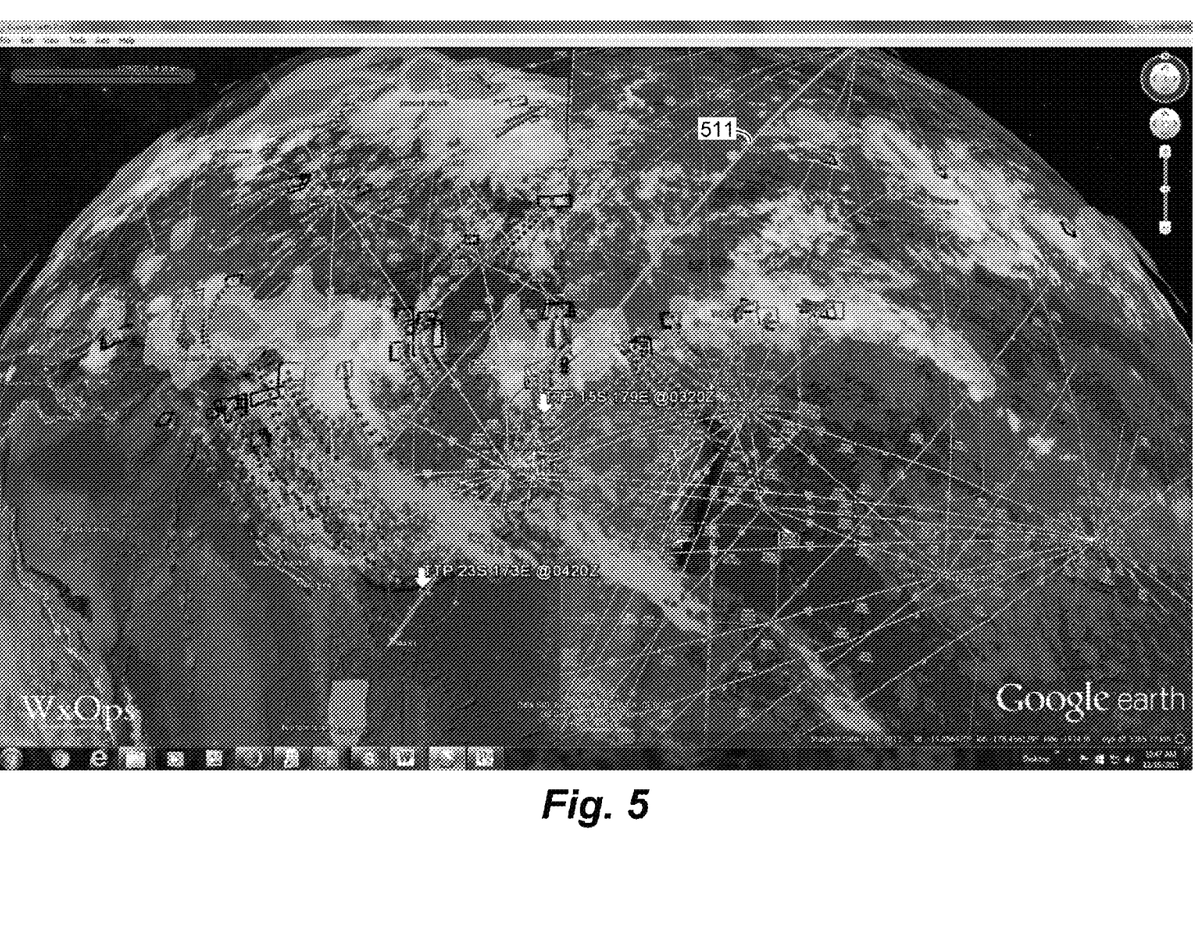
FIG. 5 is a depiction of a display showing an overlay using a Google Earth (GE) geobrowser showing approximate location of transported turbulence prediction regions as a function of time and flight levels.

FIG. 5 is a depiction of a display showing an overlay using a Google Earth (GE) geobrowser showing approximate location of transported turbulence prediction region as a function of time and flight levels. This is rendered as an animation, so that temporal changes can be observed. The colored dots show hour-by-hour forecast locations of possible turbulence at Flight Levels 400 (green) 380 (blue) and 360 (red). Red circles with white arrows show intersections between flight tracks and concurrent transported turbulence prediction positions. The depicted display is given by way of non-limiting example, as it is expected that there will be various implementations of the disclosed technology.

In FIG. 5, transported turbulence prediction KML indications were generated for the period 8-10 Dec. 2015. This shows show the Common Operating Environment (COE) analysis for Hawaiian Flight HA451, departing HNL (Honolulu) for SYD (Sydney) on 8 Dec. 2015 (9 Dec. 2015 UTC). The transported turbulence prediction KML show 4D HYSPLIT isentropic forward trajectories emanating from TSTM source areas, where dot spacing is one hour of transit time. Color coding is used to identify the Flight Level. The 4D Flight Track for HA451 is shown in light blue 511. It is noted that the TSTM source areas generally exist for several hours, which results in a transported turbulence prediction string that is spread out over several hours in transit time. When crossing the flight track, the transported turbulence prediction intersects are more probable; however, the altitude of the transported turbulence layer is a factor, since typical flight levels may be below TSTM blow-off, especially in the tropics. This implies a role of source area intensity and injection height in the severity of transported turbulence that may be encountered. Pilot observations were obtained as requested by the dispatchers. All PIREPS obtained indicate the presence of turbulence in the transported turbulence prediction areas, in otherwise "SMOOTH" conditions.

Figure 6A:
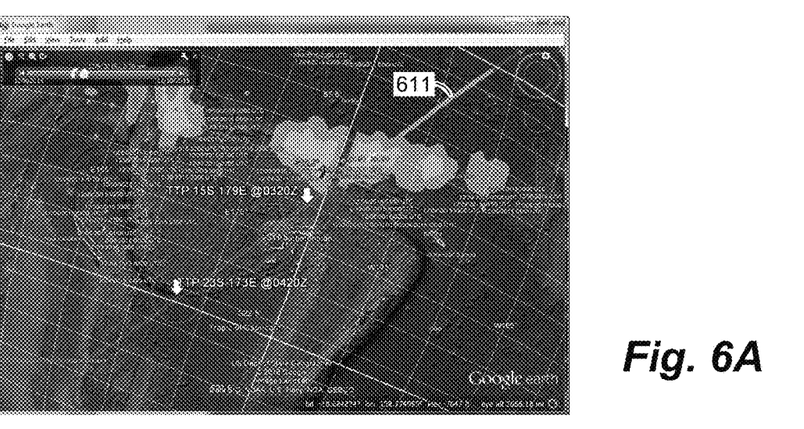
FIGS. 6A-6C are three frames of the dynamic rendering, it being understood that these figures represent three separate frames of the dynamic display.
Figure 6B:
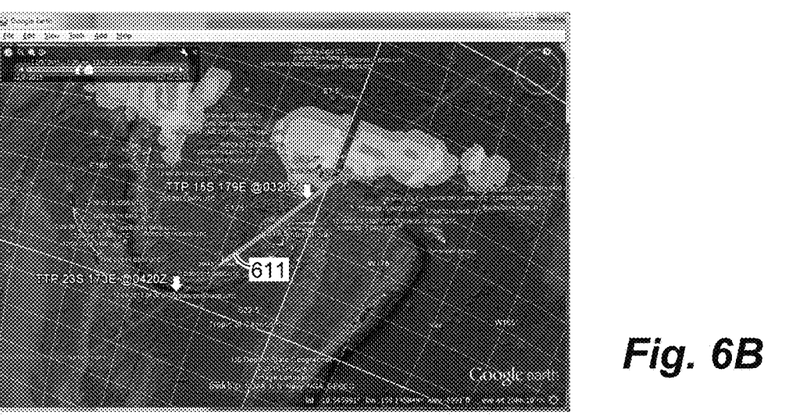
Figure 6C:
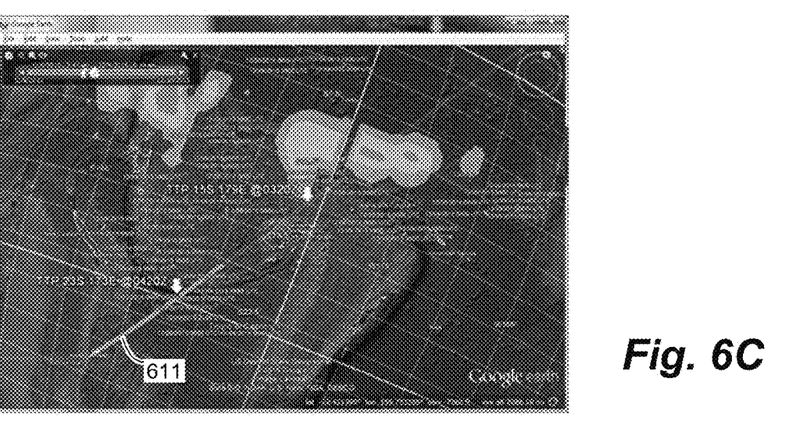

FIGS. 6A-6C are three frames of the dynamic rendering, within a shorter timespan, of than shown in FIG. 5, so that the time period of FIGS. 6A-6C is approximately 3 hours, as compared to the flight duration of about 10 hours, a main segment of which is depicted in FIG. 5. FIG. 6A is a rendering at 9 Dec. 2015, 0220 UTC, approaching a first potential transported turbulence prediction intersection. FIG. 6B is a rendering at 0347 UTC, approaching a second potential transported turbulence prediction intersection. FIG. 6C is a rendering at 0514 UTC, after transit across the two transported turbulence prediction intersections. These figures represent three separate frames of the dynamic display, providing a visualization of the relevant aspects of the predicted transported meteorological disturbance trajectories. These visualizations provide warnings for the flight crew of the predicted meteorological disturbances. The depicted display is given by way of non-limiting example, as it is expected that there will be various implementations of the disclosed technology.

The three frames of FIGS. 6A-6C present an overlay using a Google Earth (GE) geobrowser "animation" showing approximate location of transported turbulence prediction region as a function of time and flight levels. The colored dots show hour-by-hour forecast locations of possible turbulence at Flight Levels 400 (green) 380 (blue) and 360 (red). Red circles with white arrows show intersections between flight tracks and concurrent transported turbulence prediction positions.

As indicated above in connection with FIG. 5, in FIGS. 6A-6C, transported turbulence prediction KML indications were generated for the period 8-10 Dec. 2015. These figures show the Common Operating Environment (COE) analysis for Hawaiian Flight HA451 (HNL-SYD) as described in connection with FIG. 5. The transported turbulence prediction KML show 4D HYSPLIT isentropic forward trajectories emanating from TSTM source areas, where dot spacing is one hour of transit time. Color coding is used to identify the Flight Level. The 4D Flight Track for HA451 is shown in light blue 611, although some mental adjustment is needed in this case since the flight was running about 30 minutes late.

The transported turbulence prediction probability estimation method is broken down into steps as follows:

1. A flight plan is defined, including waypoints from origin to destination.
2. A regular grid is set up about the flight plan, including grid points to the port and starboard of the flight plan, and altitudes above and below the flight plan.
3. For each point in the grid, which includes the points along the flight plan, reverse (aka "back") trajectories are calculated to show the potential areas where transported turbulence sources may originate.
4. A calculation of transported turbulence is performed at grid points for various altitude levels.
5. Transported turbulence probability is determined based upon potential gradients in meteorological parameters.
6. Transported turbulence probability information is determined from prediction models and obtained data.
7. Transported turbulence prediction updates are obtained by use of updated data, using prediction models.
8. In situ warnings are provided.
9. Transported turbulence probability levels are determined.

Received Information

The transported turbulence probability is established and displayed at several heights, including levels at, above and below the flight path. Transported turbulence prediction probability shows areas where the flight may encounter the remnants of previous vertical mixing events. Transported turbulence prediction is provided as a function of altitude and position in a format that can be plotted on an EFB (with suitable display/processing capability), and is nominally tailored to match the flight arrival time along the flight path. Therefore a set of transported turbulence prediction KML or charts are provided that can be animated in time, so that the pilot/dispatcher can understand when the aircraft will transit such areas, and thereby how to avoid or achieve a transit.

The information basis for the above steps follow received information.

1. In defining the flight plan, the inclusion of waypoints from origin to destination is shown in FIG. 5, which is given by way of non-limiting example. Waypoints include estimated time or arrival and planned flight altitude at each waypoint.
2. A regular grid is set up about the flight plan, including grid points to the port and starboard of the flight plan, and altitudes above and below the flight plan. Source regions for transported turbulence are identified upwind of the flight plan to limit processing to those sources which are relevant to that flight. Source strength is set up about the flight plan, derived from available data including satellite imagery for convective diameter, updraft strength and starboard of the flight plan, cloud top height, lightning for updraft location and strength, and model information for injection altitude.
3. The calculation of each point in the grid, which includes the points along the flight plan, reverse trajectories shows the potential areas where transported turbulence sources may originate. For each transported turbulence source area, forward isentropic trajectories are computed to estimate horizontal/vertical transport and shear at altitudes above and below the transported turbulence injection height range. This is shown schematically in FIG. 7. Trajectory time steps are typically on the order of one hour for transported turbulence, as well as volcanic aerosol and radionuclide hazards. Color is used to convey source altitude information in the cockpit depictions such as shown in FIGS. 5 and 6.
4. The calculation of transported turbulence is performed at grid points for various altitude levels, in order to provide the aircraft with the option to change altitude to avoid transported turbulence, and/or at grid points adjacent to (left or right of) the flight plan, in case the aircraft has option to alter course in order to avoid transported turbulence. The transported turbulence transport predictions are provided to the visual display system as KML or other equivalent data format, which supports the display of 3D location in space as a function of time, and animation of the intersection with flight plans where time is the primary variable, as shown in FIGS. 5 and 6.
5. The transported turbulence prediction based upon potential gradients in meteorological parameters, includes momentum (i.e., wind shear), temperature and/or humidity or virtual temperature (i.e., density gradients). The technique allows for preservation of atmospheric parameters during transport over periods of time longer than typically assumed by model parameterizations. This allowance is governed by the preservation of air parcel properties or tracers due to suppression of mixing in the presence of thermal stratification, including thermal inversions.
6. The transported turbulence prediction information, as depicted in FIGS. 5 and 6, shows areas where the flight may encounter the remnants of previous vertical mixing events. Transported turbulence prediction is provided as a function of altitude and position in a format that can be plotted on an EFB, with suitable display and processing capability, and is nominally tailored to match the flight arrival time along the flight path. Therefore a set of transported turbulence prediction charts are provided that can be animated in time, so that the pilot or dispatcher can understand when the aircraft will transit such areas, and thereby how to avoid or intercept a transported turbulence prediction transit. Transported turbulence warnings or alerts are transmitted to the flight deck either during a pre-flight briefing, or during flight using available communication devices. For long-haul flights, the warnings are typically provided during flight since transported turbulence source regions do not arise until after takeoff. The transported turbulence prediction KML is provided directly to the pilot through an Electronic Flight Bag (EFB) for those compatible EFB systems which provide geobrowser COE support.
7. Transported turbulence prediction updates represent changes in the transported turbulence probability. The transported turbulence prediction changes depending upon vertical mixing upwind, so the transported turbulence predictions are updated as new observation information becomes available. Models are not a reliable source of such information; rather, the upwind mixing is estimated from available observations from satellite, lightning, and/or radar resources. These data inputs are typically available from real time (lightning) to hourly (satellite imagery). A compromise is made to reduce the informational load on pilots, such that, by way of non-limiting example, transported turbulence prediction updates are provided hourly. Sources of turbulence that are close to the flight plan are nominally handled or addressed by existing systems. This is the so-called "near cloud" turbulence.
8. In situ warnings are generated based on flight data and transported turbulence predictions. When coupled to the flight data system (aka flight data bus), an EFB application can compare the flight data (temperature, humidity, wind velocity) with the transported turbulence prediction, which also show how the entrained momentum/density depart from the ambient (background) flow and atmospheric properties. The data suggest that in some cases the flight data may provide a verification that changes in ambient atmospheric parameters may be underway, and fitting the expected changes associated with a transported turbulence region transit. More often, however, the encounter with transported turbulence remnants occurs suddenly and without warning. Since the transported turbulence remnants are associated with differences in temperature and/or humidity when compared to ambient, the transported turbulence prediction warning may be enhanced when used in conjunction with a forward looking remote sensing device.
9. Transported turbulence prediction probability levels are generated based on transported turbulence predictions. Depending on the expected strength of gradients in momentum and/or temperature (actual and virtual), the transported turbulence prediction may be provided with indication of potential strength. Transported turbulence prediction levels are envisioned to be categorized as LIGHT, MODERATE or SEVERE. Alternately, an EDR value can be provided which is proportional to the strength of accelerations that may be expected in predicted conditions.

Figure 7:
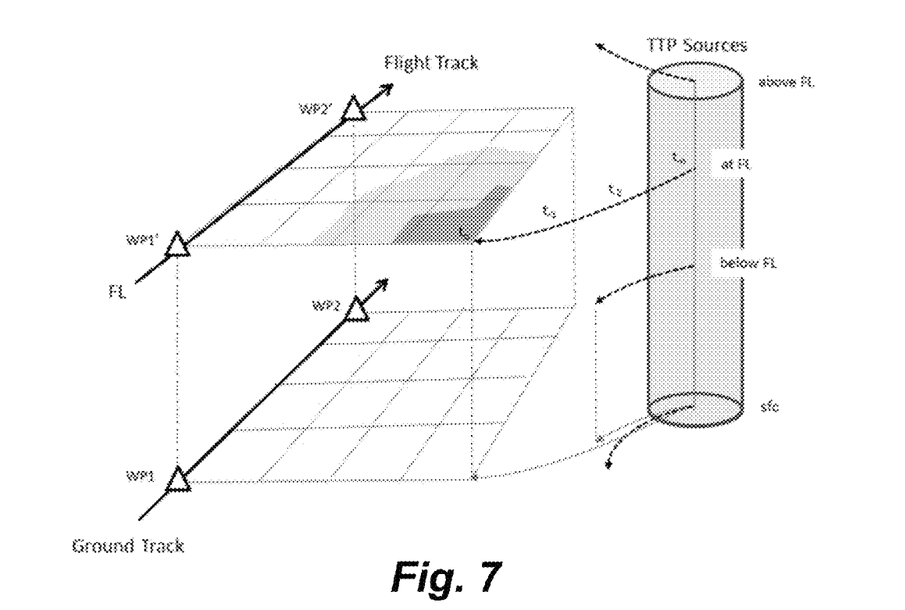
FIG. 7 is a schematic diagram showing vertical and horizontal motion of transported turbulence or other atmospheric tracer as it moves at several vertical levels from a source region to the vicinity of a flight track.

FIG. 7 is a schematic diagram showing the flight operation of FIGS. 5 and 6. The diagram is a transported turbulence prediction grid at flight level and ground, extending to the right of the flight track from WayPoint WP1 to WayPoint WP2. Reverse (back) isentropic trajectories are used to identify any collocation with sources for transported turbulence. The transported turbulence prediction is produced for levels at, above and below the planned flight track. The transported turbulence prediction products may be updated at least hourly to allow for real time changes in transported turbulence sources upwind of the flight track. The transported turbulence prediction source is shown as a vertical column, representing vertical mixing from the surface and up to cloud top height for instance of deep convection.

CONCLUSION

It will be understood that many additional changes in the details, materials, steps and arrangement of parts, which have been herein described and illustrated to explain the nature of the subject matter, may be made by those skilled in the art within the principle and scope of the invention as expressed in the appended claims.

What is claimed is:

1. An aviation flight planning system for predicting and warning for intersection of flight paths with transported meteorological disturbances comprising transported turbulence and related phenomena, comprising:

a coordinating computer located on board an aircraft receiving sensed data from sensing equipment on board the aircraft providing real time sensed information related to meteorological conditions, and transmitted data received on board the aircraft, providing real time and forecast data related to meteorological conditions;

a flight plan information store communicatively connected to the coordinating computer;

a transported meteorological disturbances model store providing the coordinating computer with data modelling transported meteorological disturbances, with the received transmitted data and the sensed data to use the data modelling transported meteorological disturbances to correlate the sensed data and received transmitted data to identify transported meteorological disturbances source characteristics, identify predicted transported meteorological disturbances trajectories from source to intersection with a flight path indicated by the flight plan in space and time and communicate relevant aspects of the predicted transported meteorological disturbances trajectories;

communications to return observations from flight deck for verification and analysis; and a visualization system configured to:

acquire at least one flight track as a focus object;

acquire at least one transported turbulence prediction as a focus object;

use focus object information to display at least a plurality of the focus objects;

subdivide each focus object into a plurality of object components;

use a transparent interface to calculate coordinates of components of the focus object in a coordinate system of the visualization system, said focus object mutually shared by the visualization system and the interface;

receive coordinates of a point of interest (POI) in a projection of the visualization system;

project the POI in a selected point of view (POV) using the calculated coordinates and the received coordinates of the POI in the projection of the visualization system of N-dimensional features in the visualization, independent of user point of view; and display the flight track and the relevant aspects of the predicted transported meteorological disturbances trajectories as warnings for the flight crew.

2. The aviation flight planning system according to claim 1, wherein the transported meteorological disturbance comprises transported turbulence.

3. The aviation flight planning system according to claim 1, wherein the transported meteorological disturbance comprises related phenomena comprising phenomena having similar transport characteristics to transported turbulence, and comprises volcanic gases and aerosols, radionuclide plumes, and tracers deliberately inserted to simulate a hazard source.

4. The aviation flight planning system according to claim 1, wherein the relevant aspects of the predicted transported meteorological disturbances trajectories comprise strength and modification of hazard is predicted or observed during transport from source to point of intersection.

5. The aviation flight planning system according to claim 1, wherein the visualization system identifies regions for potential source areas by the flight plan and potential transport paths.

6. The aviation flight planning system according to claim 1, wherein:

the visualization system presents information about the focus objects with or without user interaction; and the visualization system displays the relevant aspects of the predicted transported meteorological disturbances trajectories as warnings for the flight crew without user interaction and automatically generates an alert upon detection of an intersection of the flight track with transported turbulence within a predetermined time period.

7. The aviation flight planning system according to claim 1, wherein flight decks comprise flight decks for aircraft consisting of the group selected from manned, remote piloted vehicles, and automated unmanned systems.

8. The aviation flight planning system according to claim 1, wherein the transmitted data received on board the aircraft comprises data selected from the group selected from observations, modeling, source strength, time range of occurrence, and altitude for injection of hazardous material or precursors.

9. The aviation flight planning system according to claim 1, further comprising an archive data store used to store observations of hazard strength at the intersection of flight paths with transported meteorological disturbances or waypoints characterizing hazard behavior and frequency of occurrence.

10. A method for predicting and warning of intersection of flight paths with transported meteorological disturbances comprising transported turbulence and related phenomena, and accounting for source characteristics, transport mechanism and modification of hazard during transport, and identification of the point of intersection with an aircraft flight path, the method comprising:

sensing data from sensing equipment on board the aircraft providing real time sensed information related to meteorological conditions, and receiving transmitted data providing real time and forecast data related to meteorological conditions;

storing flight plan information;

using a transported meteorological disturbances model to provide data modelling transported meteorological disturbances along the flight path indicated by the flight plan information;

analyzing the sensed data and the transmitted data using the data modelling transported meteorological disturbances to correlate the sensed data and transmitted data to identify transported meteorological disturbances source characteristics, identify predicted transported meteorological disturbances trajectories from source to intersection with flight path in space and time and communicate relevant aspects of the predicted transported meteorological disturbances trajectories; and providing visualization of the analyzed data by:
  acquiring at least one flight track as a focus object;
  acquiring at least one transported turbulence prediction as a focus object;
  using focus object information to display the focus objects;
  subdividing each focus object into a plurality of object components;
  using a transparent interface to calculate coordinates of components of the focus object in a coordinate system of the visualization system, said focus object mutually shared by the visualization system and the interface;
  receiving coordinates of a point of interest in a projection of the visualization system;
  projecting the point of interest (POI) in a selected point of view (POV) using the calculated coordinates and the received coordinates of the point of interest in the projection of the visualization system of N-dimensional features in the visualization, independent of user point of view; and
  displaying the flight track and the relevant aspects of the predicted transported meteorological disturbances trajectories as warnings for the flight crew.

11. The method according to claim 10, further comprising providing source characterization by a combination of observations and modeling, the source characterization comprising source strength, time range of occurrence, and altitude for injection of hazard material or precursors.

12. The method according to claim 10, further comprising predicting strength and modification of hazard during transport from source to point of intersection.

13. The method according to claim 10, further comprising archiving observations of hazard strength at intersections and using the archived observations to characterize hazard behavior and frequency of occurrence.

14. The method according to claim 10, wherein the transported meteorological disturbance comprises transported turbulence.

15. The method according to claim 10, wherein the transported meteorological disturbance comprises related phenomena comprising phenomena having similar transport characteristics to transported turbulence, and comprises volcanic gases and aerosols, radionuclide plumes, and tracers deliberately inserted to simulate a hazard source.

16. The method according to claim 10, wherein the relevant aspects of the predicted transported meteorological disturbances trajectories comprise strength and modification of hazard is predicted or observed during transport from source to point of intersection.

17. The method according to claim 10, wherein the visualization of the analyzed data comprises identifying regions for potential source areas by the flight plan and potential transport paths.

18. The method according to claim 10, wherein the visualization of the analyzed data comprises:
  presenting information about the focus objects with or without user interaction; and
  displaying the relevant aspects of the predicted transported meteorological disturbances trajectories as warnings for the flight crew without user interaction and automatically generates an alert upon detection of an intersection of the flight track with transported turbulence within a predetermined time period.

19. The method according to claim 10, wherein the received transmitted data comprises data selected from the group selected from observations, modeling, source strength, time range of occurrence, and altitude for injection of hazardous material or precursors.

* * * * *